L. G. G. DIBBETS.
CENTRIFUGAL BASKET.
APPLICATION FILED FEB. 5, 1915.

1,160,052.

Patented Nov. 9, 1915.

WITNESSES

INVENTOR
Laurent G. G. Dibbets
BY
ATTORNEYS

UNITED STATES PATENT OFFICE.

LAURENT G. G. DIBBETS, OF THE HAGUE, NETHERLANDS.

CENTRIFUGAL BASKET.

1,160,052.  Specification of Letters Patent.  Patented Nov. 9, 1915.

Application filed February 5, 1915. Serial No. 6,277.

*To all whom it may concern:*

Be it known that I, LAURENT G. G. DIBBETS, a subject of the Queen of the Netherlands, and a resident of The Hague, country of the Netherlands, have invented a new and Improved Centrifugal Basket, of which the following is a full, clear, and exact description.

My invention relates to centrifugal filtering devices, and has reference more particularly to the centrifugal basket.

An object of the invention is to provide a centrifugal basket in which the material through which the sugar juices are to be filtered can be easily and quickly removed from the basket for cleaning.

A further object of the invention is to provide a simple, strong and efficient centrifugal basket having a perforated pocket carrying the material through which the sugar juices are forced by the centrifugal force and which basket is adapted in addition to carry a layer for protecting the material in the pocket from clogging too quickly by the sugar juices forced therethrough.

With the above and other objects in view, the nature of which will more fully appear as the description proceeds, the invention consists in the novel construction, combination and arrangement of parts as herein fully described, illustrated and claimed.

Figure 1:
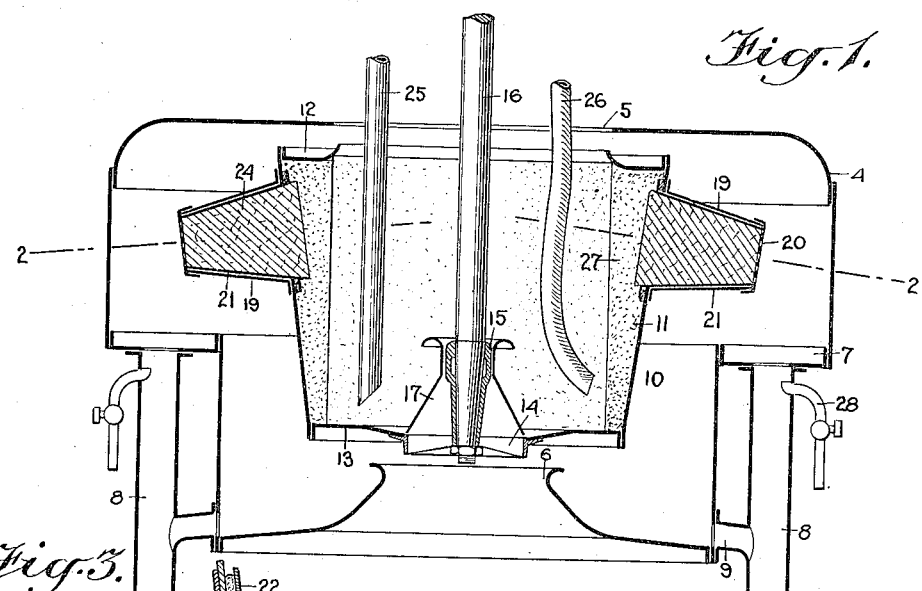
Figure 3:
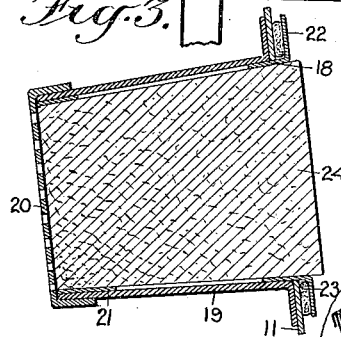
Figure 2:
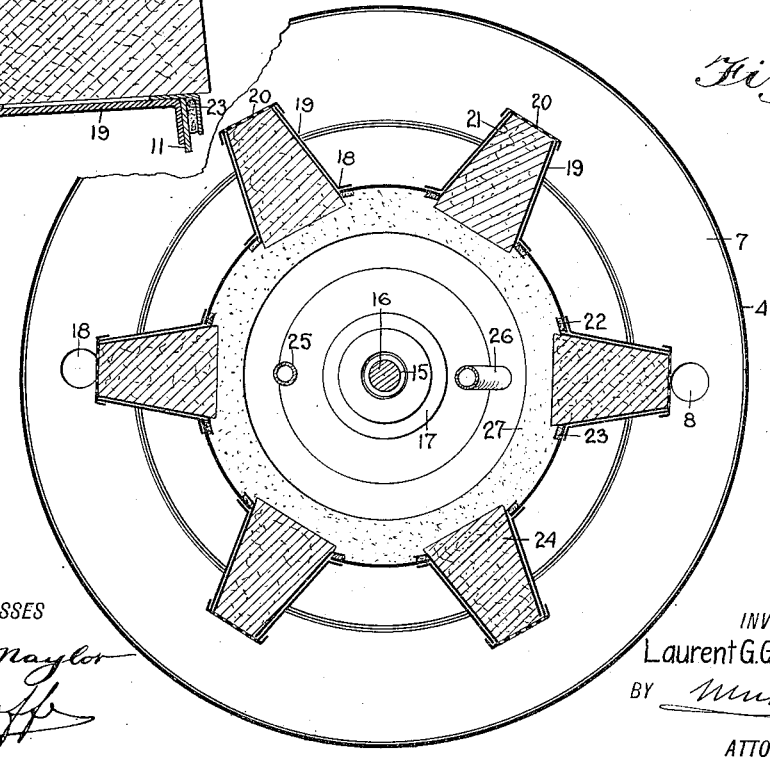

In the accompanying drawings, forming part of the application, similar characters of reference indicate corresponding parts in all the views, and Figure 1 is an elevated section through a centrifugal filter provided with my basket; Fig. 2 is a horizontal section on line 2—2, Fig. 1; and Fig. 3 is an enlarged sectional view through the pocket showing the details of construction of the same.

Referring to the drawings, 4 represents the casing having a central opening 5 in the top thereof and a central opening 6 in the bottom formed by raising the central part of the bottom inwardly into the casing. The bottom of the casing from the raised portion slopes toward the side thereof. The upper part of the casing is of a larger diameter than the lower part; and the inner shoulder or bed 7 formed by this difference in diameter is preferably in the shape of a trough. Leading from the trough downwardly are outlet pipes 8 which have a branch connection 9 to the lower part of the casing adjacent the bottom thereof.

Suspended within the casing 4 is a centrifugal basket 10 in the shape of a frustocone 11, the larger base of which is at the top, whereat a centrally apertured top 12 is provided. The bottom 13 of the basket is centrally apertured, wherein it carries a spider 14 provided with an extension 15 for connecting the basket to the driving shaft 16. The bottom 13 of the basket is made to converge toward the central opening so as to facilitate the discharge of matter from the basket through the central opening in the bottom. The funnel-shaped member 17 engaging the extension 15 normally closes the central aperture in the bottom 13 of the basket.

The lateral surface of the basket 10 adjacent the larger base, that is, adjacent the top thereof, is provided with openings 18 symmetrically disposed on the surface. The number of the openings will vary in accordance with the size of the basket and the amount of juice to be filtered per unit of time. Secured to the outer lateral surface of the basket 10, at each opening 18, is a laterally directed pocket 19, which pocket is frustocone shaped. It is open at the wider end, which has substantially the same diameter as the opening 18 in the lateral surface, while the smaller end of the pocket is closed by a perforated wall 20 which forms the bottom of the pocket. A frustocone sleeve 21 fits snugly into each of the pockets 19 through the openings 18. Said sleeve has a lateral flange 22 at its wider end which carries a gasket 23 adapted to engage the inner lateral surface of the basket 10. The annular width in the top of the basket 10 is greater than the diameter of the flange 22, so that the same can be easily placed into the basket or moved out therefrom.

Fitting tightly into each sleeve 21 is a plug 24 which is preferably of slightly compressed felt or any other suitable material, and which, due to the form of the sleeve is frustocone shaped with its narrower end against the bottom 20 of the pocket, while its larger end is made to project slightly out of the sleeve 21. The sleeve 21 has parts of its lateral surface cut out, as seen from Fig. 3, to render the same lighter and also to give a better gripping action between the plug and the sleeve. The density of the plug 24 varies in accordance with the number of revolutions given to the basket and the clearness of the juices to be obtained.

Directed into the basket 10 through the upper opening is a conduit 25 through which the juices to be filtered are fed into the basket. A flexible conduit 26 is also directed into the basket through the upper opening, through which conduit sand, sawdust or other similar material may be fed into the basket. This material is mainly intended as a protector for the felt, to prevent a too rapid clogging of the same, also, it serves as a prefiltering medium for the juices which are to be filtered through the felt plug. The sleeves 21 will be maintained in their pockets under the centrifugal force when the basket is revolved; and as the sand or similar material is fed into the basket through the conduit 26 while the basket revolves, a layer 27 of the same will be formed at the lateral surface of the basket; and the thickness of the layer will increase toward the top of the basket, due to the incline of the lateral surface of the basket. After the formation of the layer of sand within the basket, the juice is fed into the basket through the conduit 25. The juice is preferably discharged adjacent the bottom of the basket; and the centrifugal force will cause the same to travel along side the diverging lateral surface of the basket, causing it to pass through the layer of sand or similar material, partially filtering it before reaching the plug 24. The gasket 23 between the flange 22 of the sleeve and the lateral surface of the basket prevents the juice from coming through the sand and the plug and leaking through the opening 18 into the pocket 19 without passing through the felt cloth 24.

The reason for diverging the lateral surface of the basket toward the top thereof is to cause the juice to be filtered to travel upwardly. This travel will be slow, due to the slight divergency of the lateral surface and to the resistance offered by the layer 27 through which the juice has to move before it finds its outlet through the plug 24 and the apertures in the bottom of the pocket 19. By placing the pockets adjacent the top, the time of travel is increased, and, consequently, a better filtration is obtained. It will be noted that the bottom of the pockets 19 overhang the trough 7, so that the filtrated juice coming through the apertured bottom 20 of the pockets will fall on to the trough, from where it is carried off by the outlet pipes 8. The outlet pipes 8 are preferably provided with valve controlled discharge tubes 28 for taking tests of the filtrated juice passing through the pipes 8.

When the resistance of the plugs 24 to the juice becomes too high, that is to say, when the pores of the plugs are clogged, the rotation of the basket 10 is arrested, the member 17 may be raised so as to discharge the sand layer 27, which may be, if desired, washed out by any suitable means. The sleeves 21 are then withdrawn from the pockets with their plugs and new sleeves with plugs can be substituted and the cycle of the operation repeated. The withdrawn sleeves with the plugs are then washed by any suitable means. The reason for providing the plugs with a sleeve is to prevent any deformation thereof during the cleaning process.

It is self-evident that in lieu of providing a frustocone-shaped pocket at the top, the pocket may be of elongated shape extending from the top to the bottom. Furthermore, in place of a plurality of pockets as shown, a single annular pocket may be provided in which sectional plugs may be formed so that the same can be withdrawn through the top opening. The plugs will be provided similarly with sleeves to prevent a deformation of the plugs when they are cleaned.

From the foregoing description, taken in connection with the accompanying drawings, the advantage of the construction and operation of the apparatus shown will be readily understood by those skilled in the art to which the invention pertains, and while I have described the principle of operation, together with the apparatus which I now consider to be the best embodiment thereof, I desire to have it understood that the apparatus shown is merely illustrative and that such changes may be made as are within the scope of the appended claims.

Having thus described my invention, I claim as new and desire to secure by Letters Patent:

1. A centrifugal basket comprising a frustocone-shaped pocket projecting laterally from the basket, said pocket having its wider end at the basket, a perforated wall at the narrower end of the pocket, and a frustocone-shaped plug of filtering material fitting snugly into said pocket.

2. A centrifugal basket comprising a frustocone-shaped body the top of which is at the wider end, laterally directed pockets from said body adjacent the top, plugs of filtering material removably associated with each pocket and removable through said basket, said plugs adapted to be maintained against the lateral wall of the pocket by the centrifugal force.

3. A centrifugal basket comprising a cone-shaped lateral surface diverging toward the top thereof, frusto-cone-shaped pockets projecting laterally from said lateral surface adjacent the top thereof, the wider end of each of said pockets opening into said basket, a perforated wall at the narrower end of each of said pockets, and a frustocone-shaped plug of filtering material removably associated with each of said pockets.

4. A centrifugal basket comprising a frustocone-shaped lateral surface diverging toward the top thereof, frustocone-shaped pockets projecting outwardly from the lateral surface of the basket adjacent the top thereof and perpendicular to the lateral surface of the basket, the wider ends of said pockets opening into said basket, a perforated wall at the narrower end of each of said pockets, a flanged frustocone sleeve fitting snugly into each of said pockets, and a plug of filtering material carried by said sleeve, said sleeve being removable from said pocket, substantially as and for the purpose set forth.

5. A centrifugal basket comprising a perforated frusto-cone shaped pocket projecting outwardly from the lateral surface of said basket, a frustocone-shaped sleeve fitting snugly into said pocket and removable therefrom through said basket, and a plug of filtering material in said sleeve, the centrifugal force locking said sleeve in said pocket.

6. In combination, a centrifugal basket comprising a frustocone-shaped lateral surface diverging toward the top thereof, frustocone-shaped pockets projecting outwardly from the lateral surface of the basket adjacent the top thereof, the wider ends of said pockets opening into said basket, a perforated wall at the narrower end of each pocket, a frustocone-shaped sleeve fitting snugly into each of said pockets and removable therefrom through the basket, a plug of filtering material carried by said sleeve, and means for feeding granular filtering material into said basket whereby the centrifugal force is adapted to form a layer of granular material at the lateral wall of the basket, which forms a protector for the plug of filtering material.

7. A centrifugal basket comprising a frustocone-shaped pocket projecting outwardly from the lateral surface thereof, the wider end of said pocket opening into the basket, a perforated wall at the narrower end of said pocket, a frustocone-shaped sleeve fitting snugly into said pocket and removable therefrom through the basket, said sleeve having a flange at the wider end, a gasket between the flange and the lateral surface of the basket, and a plug of felt carried by the sleeve.

8. In combination, a centrifugal basket comprising a frustocone-shaped lateral surface diverging toward the top thereof, frustocone-shaped pockets projecting outwardly from the lateral surface of the basket adjacent the top thereof, the wider ends of said pockets opening into said basket, a perforated wall at the narrower end of each of said pockets, a frustocone-shaped sleeve fitting snugly into each of said pockets and removable therefrom through the basket, said sleeve having a laterally outwardly directed flange adjacent the wider end, a gasket between the flange and the lateral surface of the basket, a felt plug carried by said sleeve, and means for feeding granular material into said basket, whereby the centrifugal froce is adapted to form a layer of said granular material at the lateral surface thereof, substantially as and for the purpose set forth.

9. A centrifugal basket comprising a perforated pocket converging outwardly from the lateral surface thereof, a sleeve in said pocket removable therefrom through the basket, said sleeve adapted to be maintained against the lateral wall of the pocket by the centrifugal force, and a plug of filtering material in said sleeve.

In testimony whereof I have signed my name to this specification in the presence of two subscribing witnesses.

LAURENT G. G. DIBBETS.

Witnesses:
BENEDICT JOFFE,
GEORGE H. EMSLIE.

Copies of this patent may be obtained for five cents each, by addressing the "Commissioner of Patents, Washington, D. C."